(12) United States Patent
Gill

(10) Patent No.: US 6,636,396 B1
(45) Date of Patent: Oct. 21, 2003

(54) SPIN VALUE READ HEAD STABILIZED WITHOUT HARD BIAS LAYERS

(75) Inventor: Hardayal Singh Gill, Portola Valley, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/288,008

(22) Filed: Apr. 8, 1999

(51) Int. Cl.[7] .................................................. G11B 5/39
(52) U.S. Cl. .................................................. 360/324.12
(58) Field of Search ........................ 360/324.1, 324.11, 360/324.12

(56) References Cited

U.S. PATENT DOCUMENTS

| | | | | |
|---|---|---|---|---|
| 6,122,151 A | * | 9/2000 | Saito et al. | 360/324.12 |
| 6,185,078 B1 | * | 2/2001 | Lin et al. | 360/324.12 |
| 6,219,207 B1 | * | 4/2001 | Pinarbasi | 360/322 |

* cited by examiner

*Primary Examiner*—George J. Letscher
(74) *Attorney, Agent, or Firm*—Ervin F. Johnston

(57) ABSTRACT

The present invention employs a bottom antiferromagnetic (AFM) layer which can be employed for longitudinally biasing a free layer of a spin valve sensor and in addition pinning the magnetic moment of a pinned layer of the spin valve sensor perpendicular to the ABS. The bottom AFM layer has first and second portions in first and second regions of the read head and a third portion in a sensor region thereof. The magnetic spins of the first and second portions of the bottom AFM layer are directed parallel to and along an air bearing surface of the head while the magnetic spins of the third portion are directed perpendicular to the ABS. This can be accomplished by a unique method wherein after setting magnetic spins of the first and second portions of the AFM layer a current pulse is applied through the spin valve sensor which causes a current pulse field in combination with discrete heating of the spin valve sensor so that the third portion of the AFM layer is set without disturbing the setting of the first and second portions of the bottom AFM layer.

48 Claims, 9 Drawing Sheets

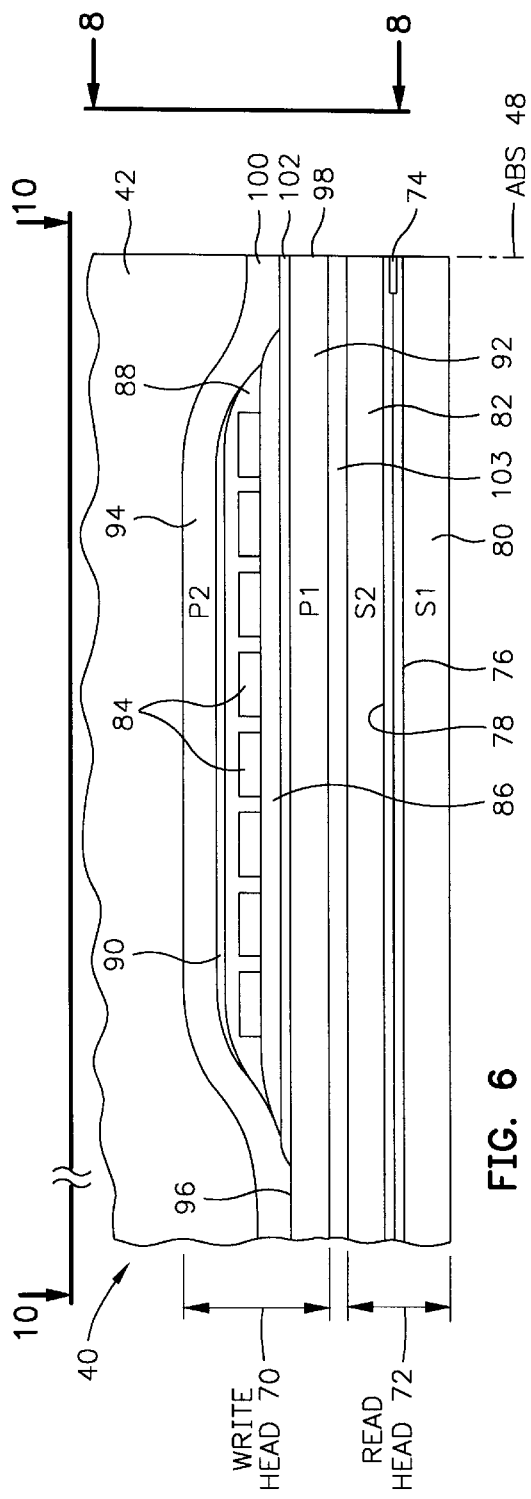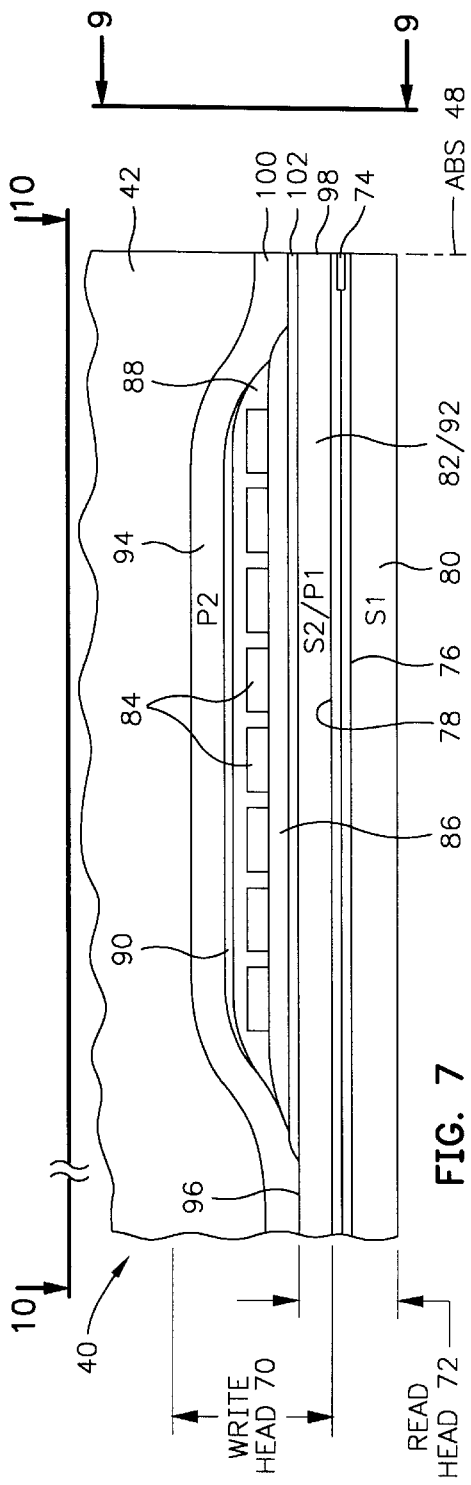
FIG. 6
FIG. 7

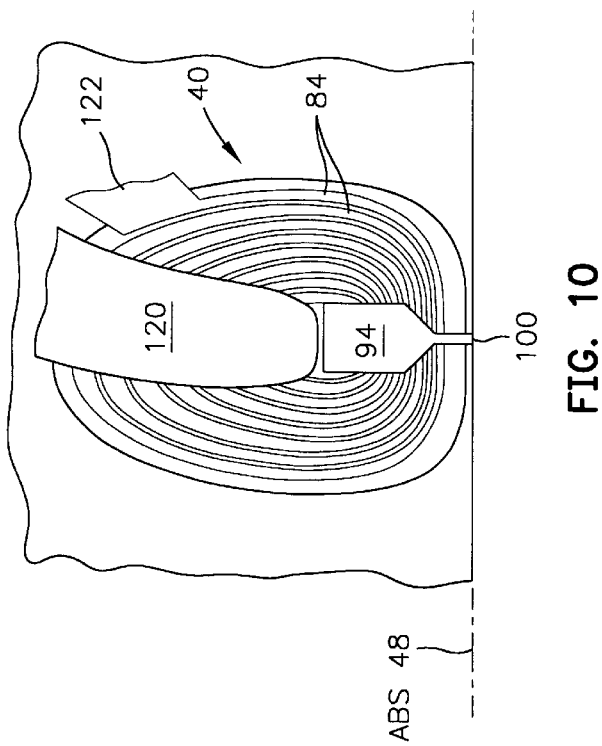

(ABS)

SPIN VALUE READ HEAD STABILIZED WITHOUT HARD BIAS LAYERS

BACKGROUND OF THE INVENTION

1. Field of the Invention

The present invention relates to a spin valve read head stabilized without hard bias layers and, more particularly, to a single antiferromagnetic (AFM) layer that is exchange coupled to the spin valve for stabilizing a free layer and/or pinning a pinned layer of the spin valve.

2. Description of the Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk adjacent the ABS causing the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic field in the pole pieces which causes flux across the gap at the ABS for the purpose of writing the aforementioned magnetic impression in tracks on moving media, such as in circular tracks on the aforementioned rotating disk.

In recent read heads a spin valve sensor is employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layers are antiparallel, scattering is maximized. Changes in scattering alter the resistance of the spin valve sensor in proportion to cos $\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor. When a spin valve sensor employs a single pinned layer it is referred to as a simple spin valve. When the spin valve sensor employs an antiparallel (AP) pinned layer it is referred to as an AP pinned spin valve. A spin valve is also know as a top or bottom spin valve depending upon whether the pinning layer is at the top (formed after the free layer) or at the bottom (before the free layer). A pinning layer in a bottom spin valve is typically made of nickel oxide (NiO). The spin valve sensor is located between first and second nonmagnetic electrically insulative read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

It is important that the free layer of the spin valve sensor be magnetically stable. During a typical construction of a spin valve sensor a bilayer photoresist is formed on top of multiple full film layers for the spin valve sensor. These full film layers are then ion milled to form the spin valve sensor with first and second side edges that are typically tapered at an angle $\theta$ with respect to a normal to the planes of the layers. First and second hard bias layers and first and second lead layers are then deposited with the bilayer photoresist still in place forming what is known in the art as contiguous junctions of the hard bias and lead layers with the first and second side edges of the spin valve sensor. Magnetostatic fields from the first and second hard bias layers are employed for the purpose of aligning the magnetic moments of the free layer so that they are all in the same direction in a single domain state. Without the hard bias layers the free layer is in a multi-domain state with the magnetic domains being defined by numerous walls. The narrower the track width the greater the magnetic instability of the free layer. When the free layer is subjected to applied magnetic fields from the rotating disk the domain walls move around which creates magnetic noise that is superimposed upon the read signal.

The aforementioned process of making contiguous junctions inherently results in a taper of the first and second side edges of the layers of the sensor. Unfortunately, the greater the angle or taper of the first and second side edges of the spin valve sensor the less the effectiveness of the first and second hard bias layers. When the first and second side edges of the spin valve sensor are tapered the first and second hard bias layers take on the soft magnetic properties of the free layer causing the first and second hard bias layers to be magnetically more soft and less capable of applying a magnetostatic coupling for stabilizing the free layer. The first and second hard bias layers are at their maximum effectiveness when the first and second side edges of the spin valve sensor are vertical or parallel to a normal to the planes of the layers. This vertical configuration has not been obtainable with the bilayer photoresist and ion milling steps for forming the first and second side edges of the spin valve sensor. Accordingly, there is a strong-felt need for a biasing scheme to longitudinally bias the free layer into a single domain state when the first and second side edges of the spin valve sensor are tapered.

Pursuant to the above objective, I investigated a scheme employing first and second antiferromagnetic layers in contact with the first and second side edges of the spin valve sensor for magnetically stabilizing the free layer. A third antiferromagnetic layer was exchange coupled to the pinned layer of the spin valve sensor for pinning the magnetic moment of the pinned layer perpendicular to the ABS. A wafer, upon which multiple read heads were constructed, was subjected to heat in the presence of a magnetic field that was directed longitudinal to the free layer, namely parallel to the ABS along the track width of the read head for setting the magnetic spins of the first and second antiferromagnetic layers in the direction of the applied field. The heat raised the temperature of the entire wafer at or above the blocking temperature of the first and second antiferromagnetic layers. The blocking temperature is the temperature at which the magnetic spins of the first and second antiferromagnetic layers are free to rotate in response to an applied field. The first and second antiferromagnetic layers may be made of a material, such as nickel manganese (NiMn) or platinum manganese (PtMn) which has a high blocking temperature of about 300° C. The third antiferromagnetic layer for pinning the pinned layer of the spin valve sensor may be made of a material, such as nickel oxide (NiO) or iridium manganese (IrMn) which has a lower blocking temperature of about 250° C.

The wafer was then subjected to heat in the presence of a field which is directed perpendicular to the ABS for setting the magnetic spins of the third antiferromagnetic layer perpendicular to the ABS. Even though the second temperature of 250° C. is less than the first temperature of 300° C., the setting of the magnetic spins of the third antiferromagnetic layer degraded the initial setting of the magnetic spins of the first and second antiferromagnetic layers. This is due to the fact that even though the second blocking temperature is lower than the first blocking temperature the magnetic spins of the first and second antiferromagnetic layers are partially rotated during the second step of setting the magnetic spins of the third antiferromagnetic layer. This degradation then reduces the effectiveness of the longitudinal biasing of the free layer by the first and second AFM layers. Accordingly, while the scheme of employing antiferromagnetic layers instead of hard biasing layers overcomes the coupling problem, the process steps in setting the third antiferromagnetic layer for pinning the pinned layer degrades the performance of the first and second antiferromagnetic layers which longitudinally bias the free layer.

SUMMARY OF THE INVENTION

The present invention provides a single antiferromagnetic layer on the first read gap which is employed for longitudinally biasing the free layer of the spin valve sensor. The single AFM layer has first and second portions located in first and second side regions of the read head and a third portion that is located in a sensor region of the read head. The sensor region of the read head is defined by the width of the bottom of the spin valve sensor and the first and second side regions are located on each side of the sensor region. In a first aspect of the invention the first and second portions of the single antiferromagnetic layer have their magnetic spins oriented longitudinally, namely parallel to the ABS along the track width. These portions are exchange coupled to first and second ferromagnetic layers, which are located in the first and second side regions, and are, in turn, exchange coupled to the first and second side edges of the free layer. Accordingly, the first and second portions of the single AFM layer magnetically stabilize the free layer via the first and second ferromagnetic layers by exchange coupling.

A second aspect of the invention includes the first aspect of the invention and further includes the third portion of the AFM layer, which is located in the sensor region of the read head, having magnetic spins oriented perpendicular to the ABS and exchange coupled to the pinned layer of the spin valve sensor for pinning the magnetic moment of the pinned layer perpendicular to the ABS. Accordingly, the first and second portions of the single AFM layer are employed for magnetically stabilizing the free layer and the third portion of the single AFM layer is employed for pinning the magnetic moment of the pinned layer.

The first aspect of the invention applies to either a top spin valve sensor or a bottom spin valve sensor. The second aspect of the invention applies to a bottom spin valve sensor. A third aspect of the invention applies to a top spin valve sensor. The third aspect of the invention includes the first aspect of the invention and further includes a second AFM layer that is exchange coupled to the pinned layer for pinning a magnetic moment of the pinned layer perpendicular to the ABS.

A method of the invention includes setting the magnetic spins of the third portion of the single AFM layer so that the initial setting of the magnetic spins of the first and second portions of the single AFM layer is not degraded. The first and second portions of the single AFM layer may be set by heat in the presence of a field which is directed longitudinal to the free layer. This may be accomplished at the wafer level or at the row level where the wafer has been cut into rows of heads. Next, a pulse is conducted through the spin valve sensor via first and second terminals on the wafer and the first and second leads causing the free layer to exert a current pulse field on the pinned layer which, in turn, orients the magnetic spins of the third portion of the single AFM layer in the same direction. The pulse heats the head discretely throughout the layers of the spin valve sensor and the third portion of the single AFM layer without unduly heating the first and second portions of the single AFM layer. Accordingly, the third portion of a single AFM layer in the sensor region is set to a perpendicular position without degrading the setting of the longitudinal orientation of the first and second portions of the AFM layer in the passive regions.

The method described hereinabove implements the second aspect of the present invention. A method to implement the first aspect of the invention sets the first and second portions of the single AFM layer. A method to implement the third aspect of the invention includes setting the first and second portions of the AFM layer and further includes setting the second AFM layer in a manner similar to that described for implementing the second aspect of the invention.

An object of the present invention is to provide an effective scheme for longitudinally biasing a free layer of a spin valve sensor without using first and second hard biasing layers.

Another object is to employ an antiferromagnetic scheme for effectively longitudinally biasing a free layer and pin a pinned layer of a spin valve sensor.

A further object is to longitudinally bias the free layer of a spin valve sensor with first and second antiferromagnetic layer portions and pin a pinned layer of the spin valve sensor with a third antiferromagnetic layer portion wherein a setting of the magnetic spins of the third magnetic layer portion does not degrade the setting of the magnetic spins of the first and second antiferromagnetic layer portions.

Still another object is to provide a single antiferromagnetic layer which has first and second portions for longitudinally biasing a free layer and a third portion between the first and second portions for pinning the magnetic moment of a pinned layer of the spin valve sensor perpendicular to the ABS.

Still a further object is to provide a method of making a spin valve read head wherein the setting of the magnetic spins of first and second portions of a single antiferromagnetic layer for longitudinally biasing a free layer is not degraded by magnetically setting the magnetic spins of a third portion of the single antiferromagnetic layer for pinning a magnetic moment of a pinned layer.

Other objects and advantages of the invention will become apparent upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

FIG. 8 is a partial ABS view of the slider taken along plane 8—8 of FIG. 6 to show the read and write elements of the piggyback magnetic head;

FIG. 9 is a partial ABS view of the slider taken along plane 9—9 of FIG. 7 to show the read and write elements of the merged magnetic head;

FIG. 10 is a view taken along plane 10—10 of FIG. 6 or 7 with all material above the coil layer and leads removed;

DESCRIPTION OF THE PREFERRED EMBODIMENTS

Magnetic Disk Drive

Figure 1:
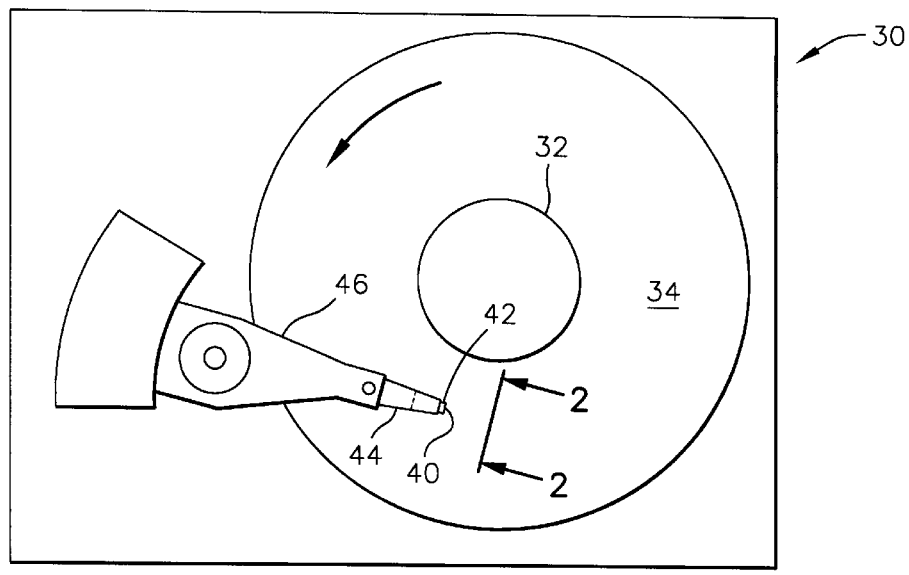
FIG. 1 is a planar view of an exemplary magnetic disk drive.
Figure 2:
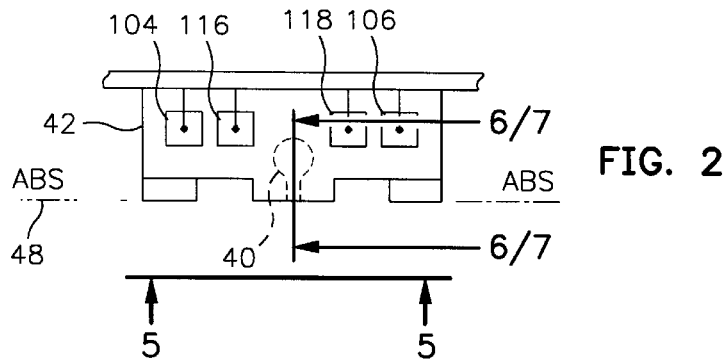
FIG. 2 is an end view of a slider with a magnetic head of the disk drive as seen in plane 2—2.
Figure 3:
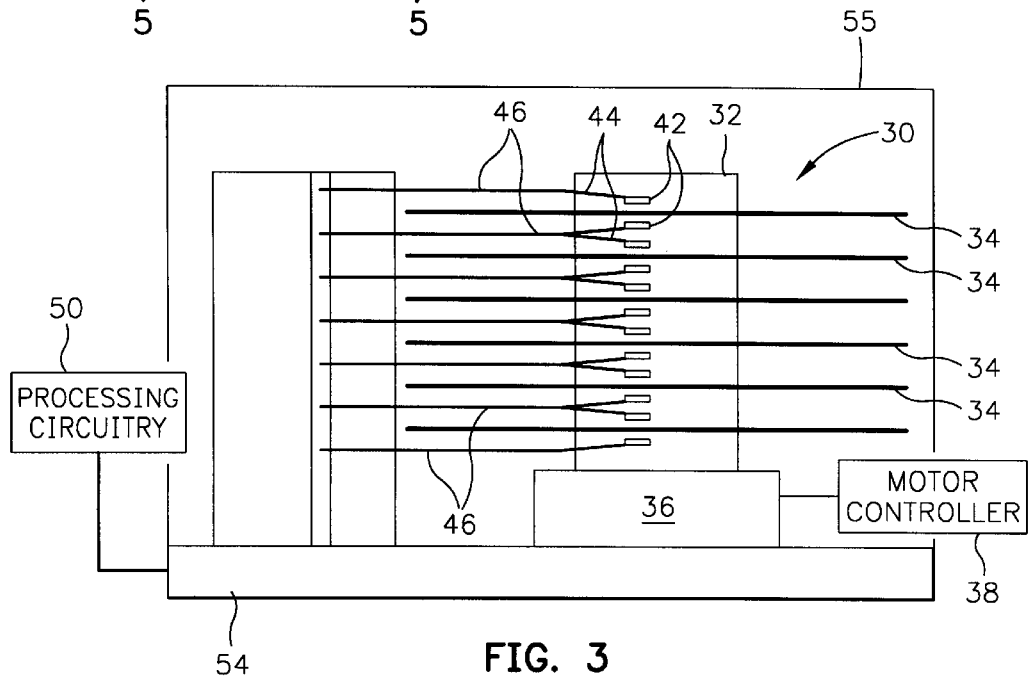
FIG. 3 is an elevation view of the magnetic disk drive wherein multiple disks and magnetic heads are employed.
Figure 4:
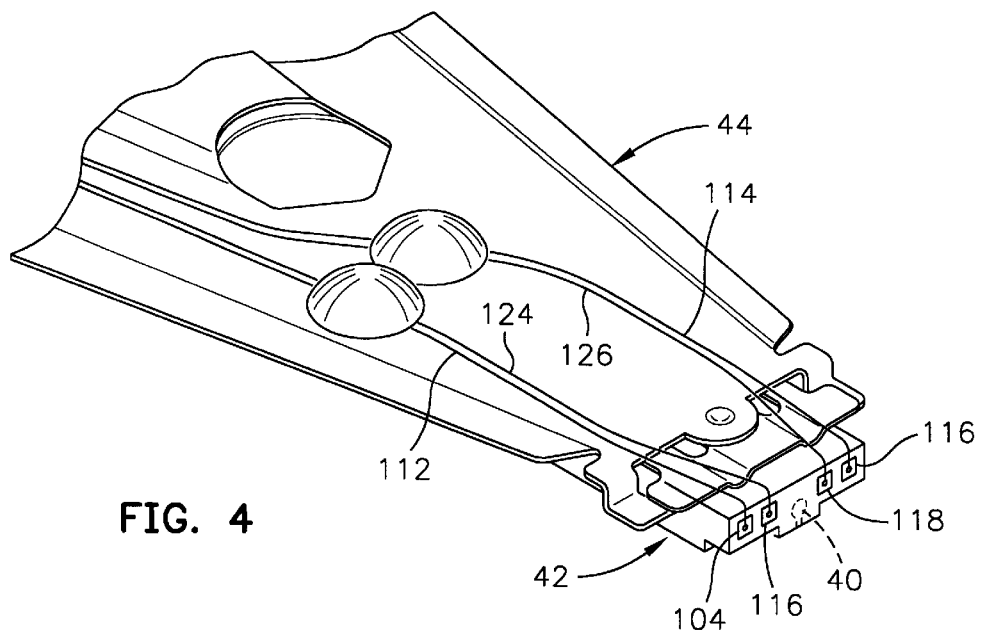
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described hereinabove may be mounted on a frame 54 of a housing 55, as shown in FIG. 3.

Figure 5:
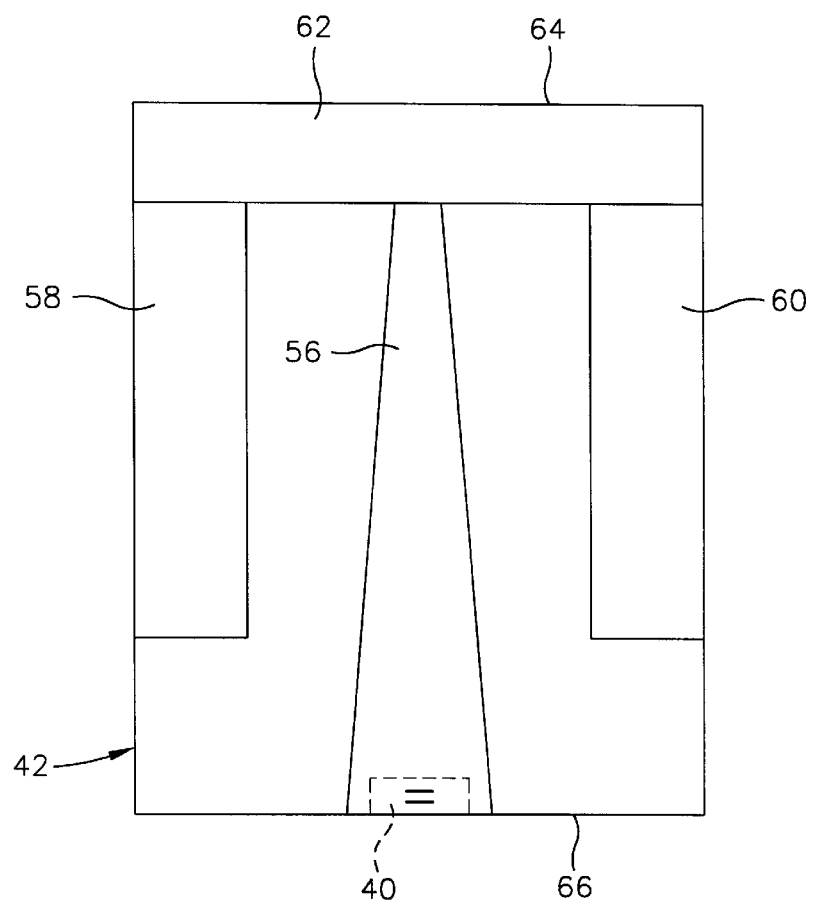
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
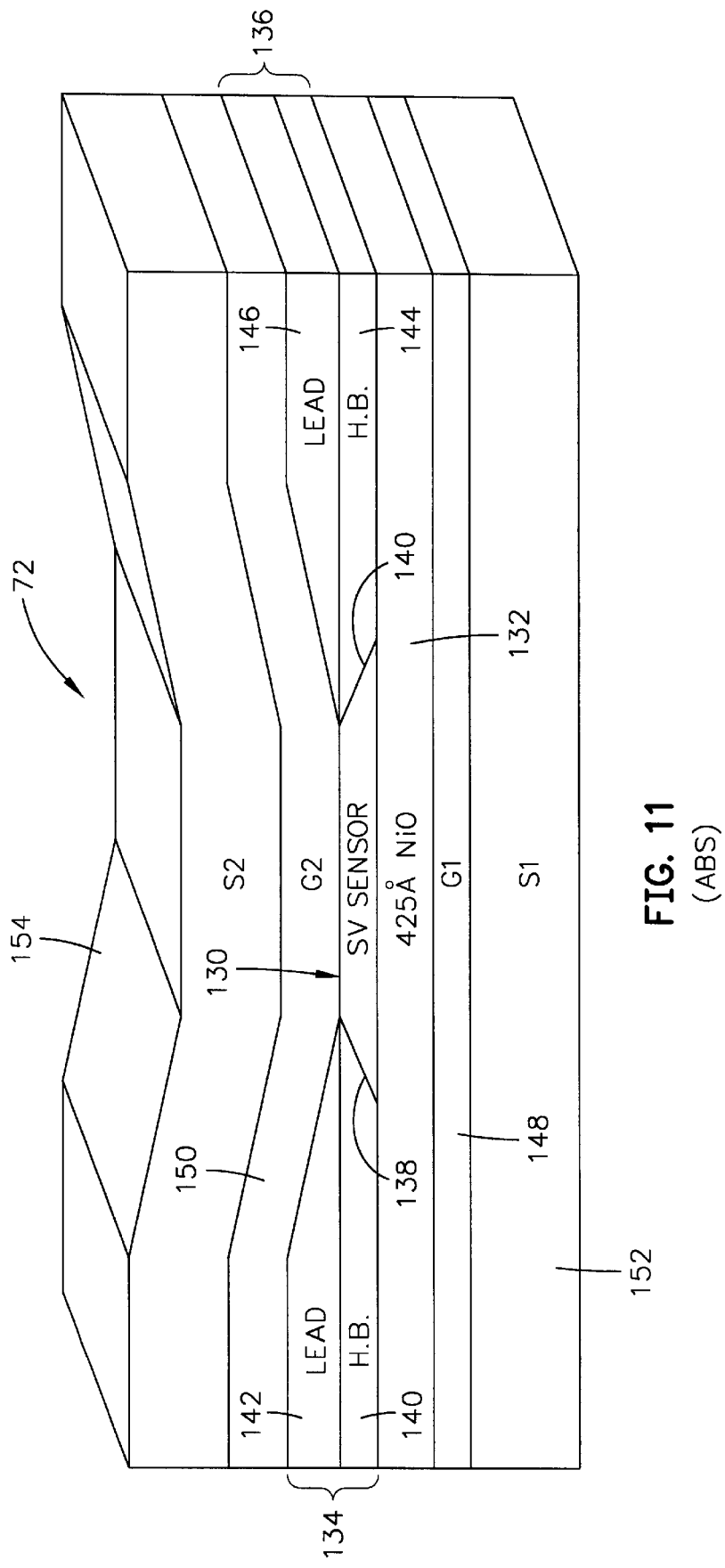
FIG. 11 is an isometric ABS illustration of a prior art read head which employs a spin valve sensor longitudinally biased by hard biasing layers.

FIG. 11 is an isometric ABS illustration of a prior art read head 72 which has a spin valve sensor 130. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers include a first hard bias layer 140 and a first lead layer 142 and the second hard bias and lead layers 136 include a second hard bias layer 144 and a second lead layer 146. The hard bias layers 140 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

It should be noted from FIG. 11 that the first and second side edges 138 and 140 of the spin valve sensor 130 are tapered at an angle θ to a normal to the planes of the layers, such as layers 148 and 132. The greater the taper the less the effectiveness of the first hard bias layers 140 and 144. Because of the taper the first and second hard bias layers 140 and 144 take on the soft properties of a free layer of the spin valve sensor 132 causing the first and second hard bias layers to lose their hard bias effectiveness. The tapering of the first and second side edges 138 and 140 is caused by a processing step which employs a bilayer photoresist. When the wafer is ion milled, shadowing effects from the bilayer photoresist causes the tapering side edges. While the photoresist mask is still in place the hard bias layers 140 and 144 are deposited followed by the leads 142 and 146, after which the bilayer photoresist is removed. Accordingly, there is a strong-felt need for an effective biasing scheme which can be employed with first and second side edges 138 and 140 which are tapered.

Figure 12:
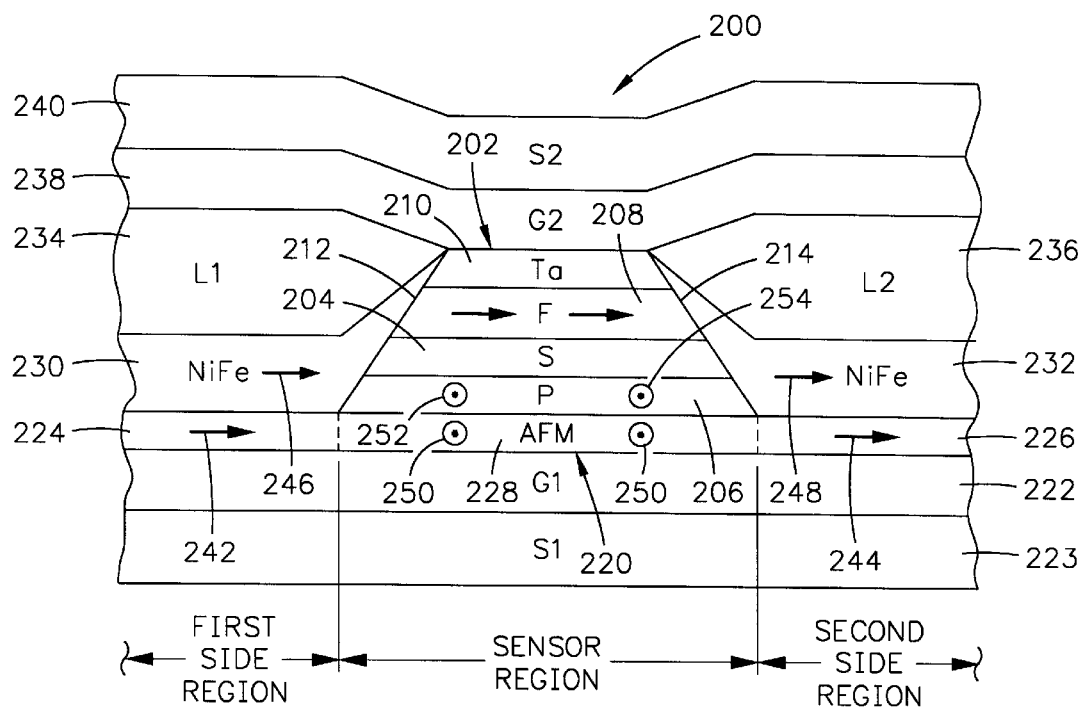
FIG. 12 is an ABS illustration of a first embodiment of the present invention.

FIG. 12 shows a first read head embodiment 200 of the present invention which employs a bottom simple pinned spin valve 202. The spin valve sensor 202 includes a nonmagnetic electrically conductive spacer layer 204, such as copper (Cu), located between a ferromagnetic pinned layer 206 and a ferromagnetic free layer 208. Layers 206 and 208 may be constructed of nickel iron (NiFe). The spin valve sensor 202 may be capped with a tantalum (Ta) layer 210 for protecting the free layer 208 from subsequent processing steps in the construction of the read head. The spin valve sensor 202 has a width that defines the sensor region of the read head. The spin valve sensor has first and second side edges 212 and 214 which are tapered at an angle θ to a normal to planes of the layers of the spin valve sensor as discussed hereinabove. The outer boundaries of the first and second side edges of the free layer 208 define the actual active region or track width as shown. First and second side regions are located to the left and right of the sensor region.

The present invention provides a bottom antiferromagnetic (AFM) layer 220 which is located on a first read gap layer 222 of the read head. The first read gap layer 222 may be aluminum oxide ($Al_2O_3$). Optionally, the first read gap may consist of only the bottom AFM layer if the AFM is nonconductive as well as being nonmagnetic. The bottom AFM layer 220 has first and second portions 224 and 226, which are located in the first and second side regions, and a third portion 228 which is located in the sensor region. The bottom AFM layer 220 will be described in detail hereinbelow.

First and second ferromagnetic biasing layers 230 and 232 are located in the first and second side regions and are exchange coupled to the first and second portions 224 and 226 respectively of the AFM layer 220 and are exchange coupled to the first and second side edges 212 and 214 respectively of the free layer. First and second lead layers (L1 and L2) 234 and 236 are located in the first and second side regions on top of the first and second ferromagnetic biasing layers 230 and 232. A second read gap structure (G2) 238 is located on top of the first and second lead layers 234 and 236 and on top of the spin valve sensor 202. A second shield layer (S2) 240 is located on top of the second read gap structure 238. It should be understood that the thicknesses of the layers in FIG. 12 are disproportionate for convenience purposes.

A first aspect of the invention is that the first and second portions 224 and 226 of the AFM layer 220 have magnetic spins 242 and 244 that pin the magnetic moments 246 and 248 of the ferromagnetic biasing layers 230 and 232 in a common direction along a length of the free layer 208. By exchange and magnetostatic couplings between the first and second biasing layers 230 and 232 and the first and second side edges of the free layer 208, the magnetism of the free layer is stabilized in a single domain state from left to right as shown in FIG. 12. It should be noted that the first and second biasing layers 230 and 232 also function as first and second flux guides for the free layer 208 so as to reduce its demagnetization field. The combined result is that the free layer 208 is urged to a highly stable single domain state. This stability prevents domain wall motion upon the application of an applied signal from the rotating disk so that the read signal is not degraded by magnetic noise.

In a second aspect of the invention the third portion 228 of the AFM layer 220 has spins oriented perpendicular to and toward the ABS as shown at 250. These magnetic spins pin the magnetic moment of the pinned layer 206 perpendicular to and toward the ABS as shown at 252 and 254. While the magnetic spins of the first and second portions 224 and 226 are shown from left to right and the magnetic spins of the third portion 228 are shown perpendicular to and toward the ABS, it should be understood that these directions may be reversed as desired. A method of orienting the magnetic spins 250 of the AFM layer 220 perpendicular to the magnetic spins 242 and 226 will be discussed hereinafter.

Figure 13:
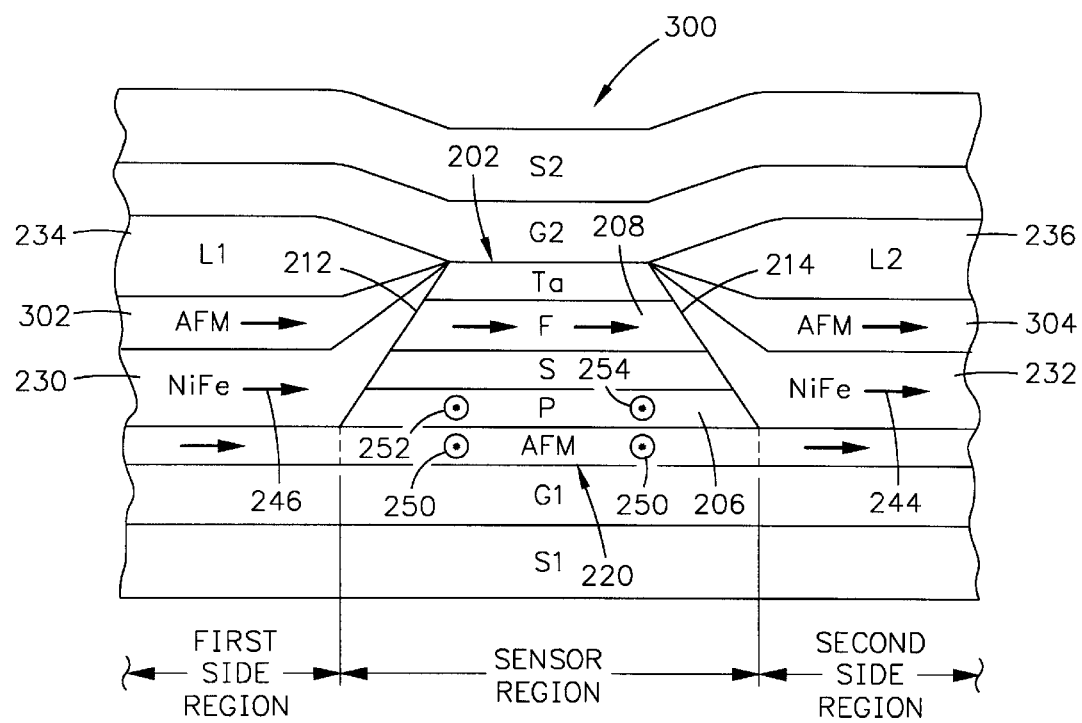
FIG. 13 is an ABS illustration of a second embodiment of the present invention.

FIG. 13 illustrates a read head embodiment 300 of the present invention which is the same as the read head 200 shown in FIG. 12 except electrically conductive second and third antiferromagnetic (AFM) layers 302 and 304 are located in the first and second side regions between the biasing layers 230 and 232 on one side and the first and second lead layers 234 and 236 on the other side. A suitable material for the AFM layers 302 and 304 is chromium manganese platinum (CrMnPt). The second and third AFM layers 302 and 304 additionally pin the magnetic moments 244 and 246 of the first and second biasing layers parallel to the length of the free layer 208.

Figure 14:
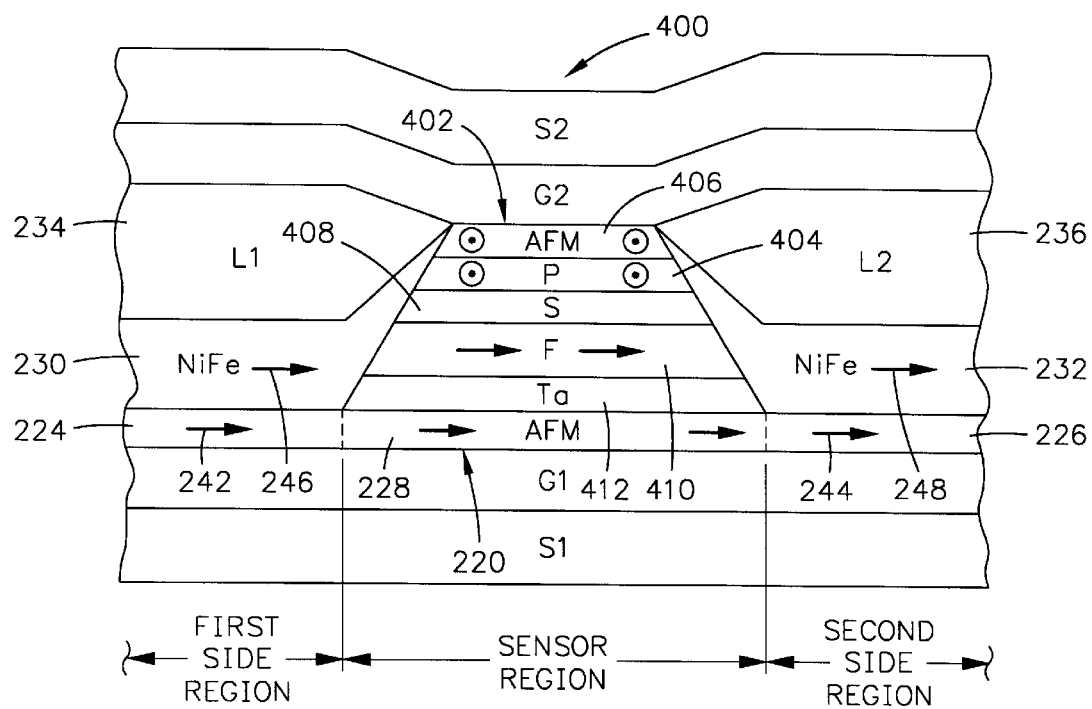
FIG. 14 is an ABS illustration of a third embodiment of the present invention.

FIG. 14 illustrates a third embodiment 400 of the present invention which differs from the first embodiment in FIG. 12 in that the spin valve sensor 402 is a top spin valve sensor instead of a bottom spin valve sensor. This means that the pinned layer 404 is located at and pinned at the top of the spin valve instead of being located at and pinned at the bottom of the spin valve. This pinning is accomplished by a second antiferromagnetic layer 406 which is exchange coupled to the pinned layer 404. The magnetic spins of the second AFM layer 406 are shown perpendicular to and toward the ABS which results in the magnetic moment of the pinned layer 404 being directed perpendicular to and toward the ABS. It is preferred that the material of the second AFM layer 406 have a blocking temperature less than 250° C. Suitable materials are nickel oxide (NiO), α ferric oxide (αFe$_2$O$_3$) and iridium manganese (IrMn). It is further preferred that the first AFM layer 220 have a blocking temperature greater then 250° C. Suitable AFM materials for this purpose are iron manganese (FeMn) or platinum manganese (PtMn). It should be understood that the above directions may be reversed if desired. A nonmagnetic electrically conductive spacer layer 408 is located between the pinned layer 404 and the free layer 410. The free layer 410 may be on a tantalum layer 412 for protecting the free layer 410 and magnetically insulating it from the bottom AFM layer 220. In this embodiment the magnetic spins of the first and second portions 224 and 226 and the third portion 228 of the bottom AFM layer are all directed in the same direction, as shown by the arrows thereon. It should be understood that this direction may be reversed if desired. The reason that the direction of the magnetic spins of the first, second and third portions of the bottom AFM layer 220 are all in the same direction is because the third portion 228 is not exchange coupled to a ferromagnetic layer and therefore cannot be reset perpendicular to the ABS. This will be evident in the following discussion regarding a method of making the various embodiments of the present invention.

Figure 15:
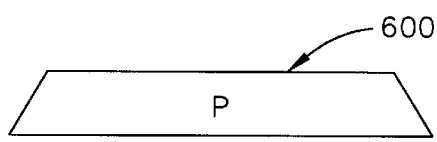
FIG. 15 is an ABS illustration of a pinned layer for a spin valve read head.
Figure 16:
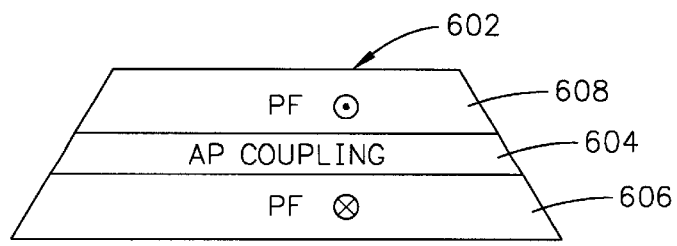
FIG. 16 is an ABS illustration of an antiparallel (AP) pinned layer for an AP pinned spin valve read head.

FIG. 15 illustrates a single pinned layer 600 which has been shown for each of the embodiments in FIGS. 12–14. It should be understood that the single pinned layer 600 may be replaced by an antiparallel (AP) pinned layer 602 as shown in FIG. 16. The AP pinned layer includes an AP coupling layer 604 which is located between first and second ferromagnetic pinned films 606 and 608. The AP coupling film 604, which is typically 8 Å of ruthenium (Ru), allows an antiparallel coupling between the first and second pinned films 606 and 608. Accordingly, if the first pinned film 606 is pinned by an antiferromagnetic layer perpendicular to and away from the ABS, as shown by ⊗, then the pinned film 608 is pinned perpendicular to and toward the ABS, as shown by ⊙.

Figure 17:
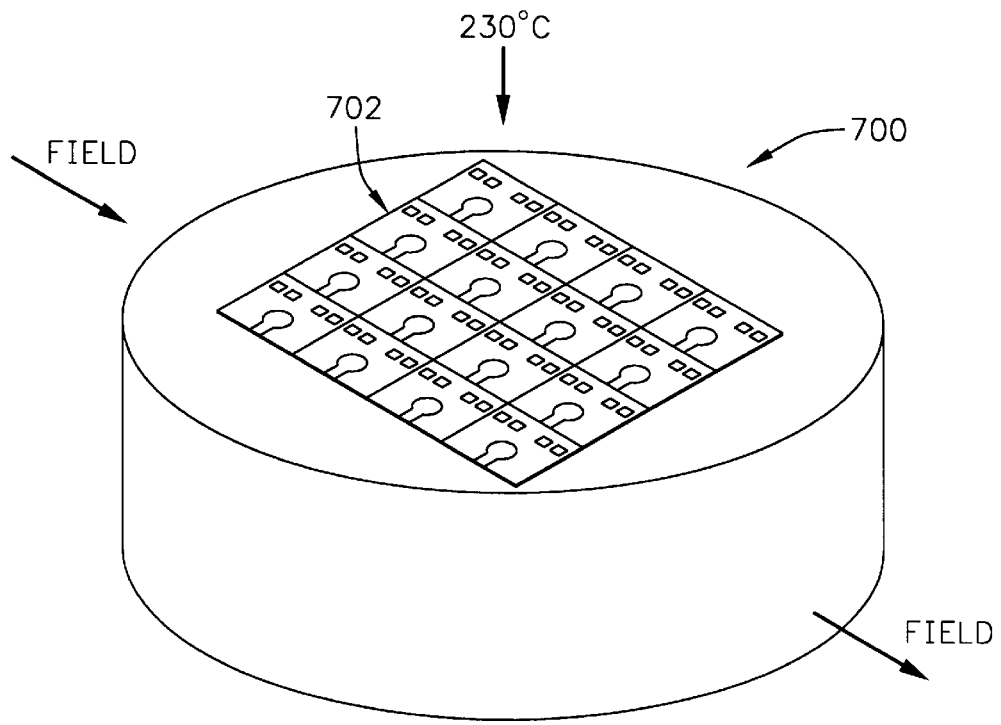
FIG. 17 is an isometric illustration of an exemplary wafer on which rows and columns of magnetic heads have been constructed.
Figure 18:
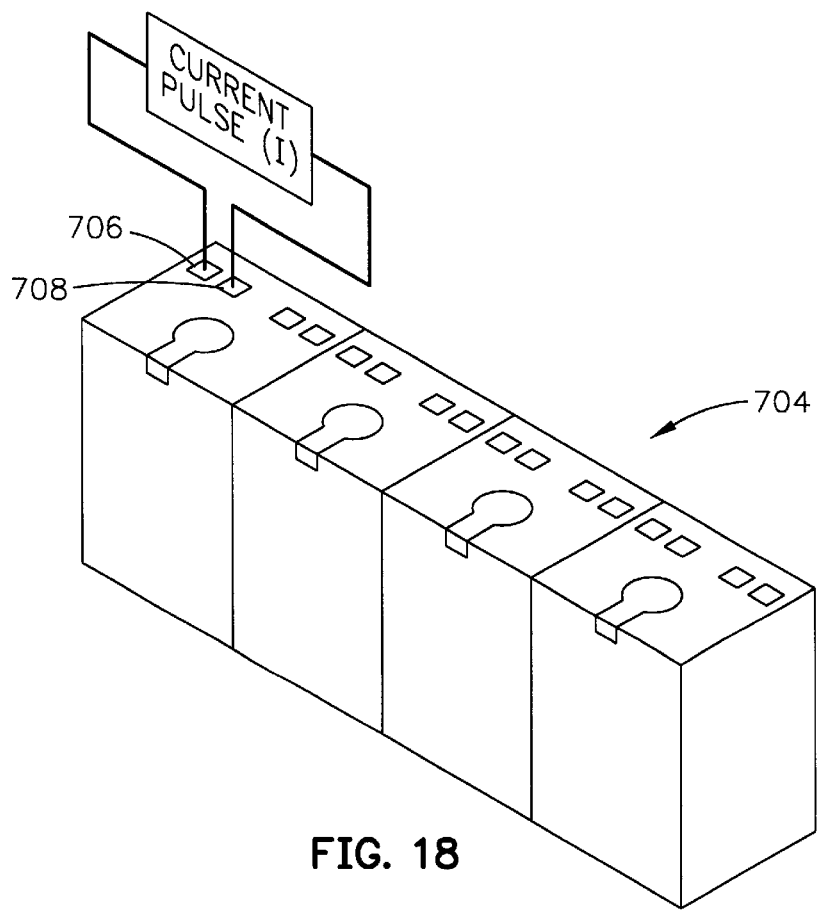
FIG. 18 is one of the rows of head of FIG. 18 after dicing the wafer.
Figure 19:
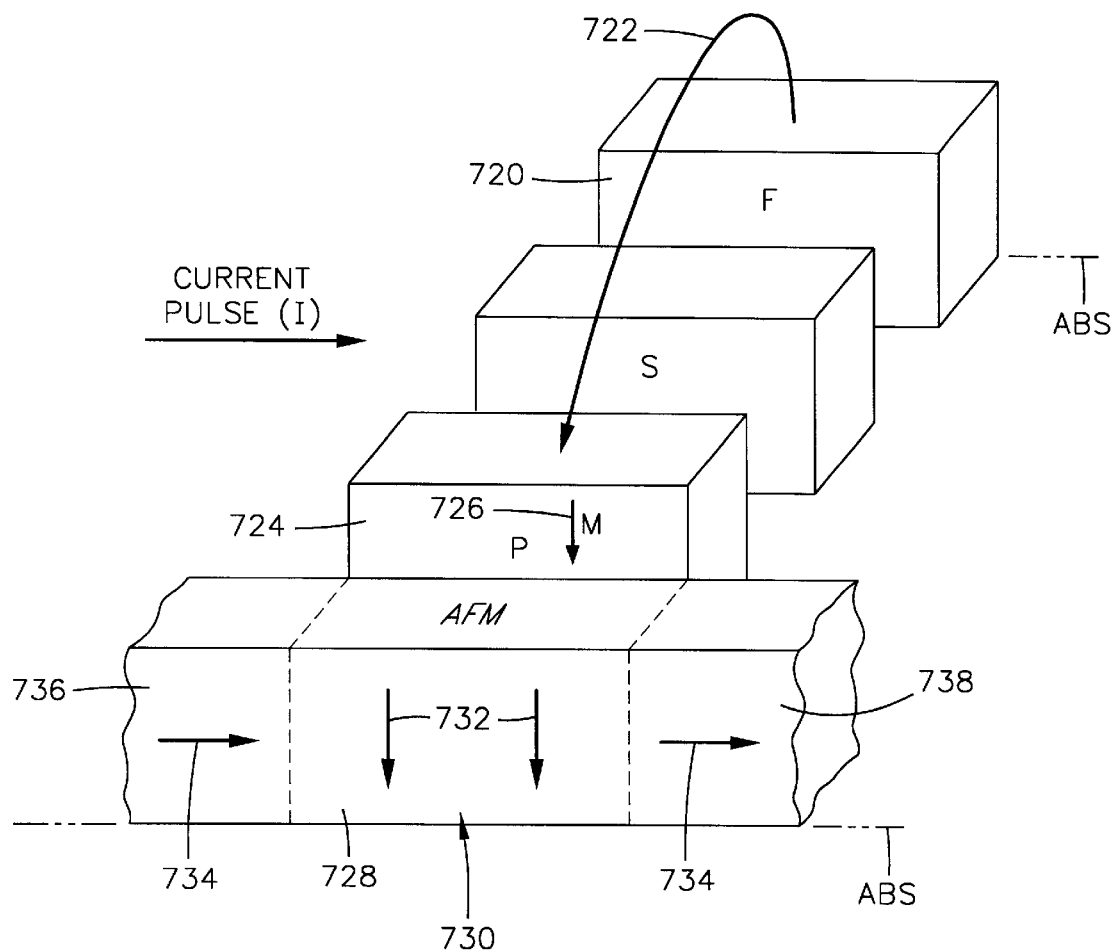
FIG. 19 is an isometric illustration of the single antiferromagnetic layer and exemplary layers of the spin valve sensor upon the application of a current pulse.

FIGS. 17, 18 and 19 show a method of the present invention for first setting the magnetic spins of the AFM layer portions 224 and 226 in FIGS. 12–14 for pinning the magnetic moments 246 and 248 of the first and second biasing layers which, in turn, longitudinally bias the free layer 208. This may be followed by setting magnetic spins of the AFM layer portion 228 in FIGS. 12 and 13 or 406 in FIG. 14 for pinning the magnetic moment of a pinned layer of the spin valve. FIG. 17 shows a wafer 700 upon which rows and columns of magnetic heads 702 have been constructed. At the wafer level the magnetic heads may be subjected to a field, as shown, directed parallel to the ABS and along the trackwidths of the heads in the presence of heat, such as 230° C., for setting the magnetic spins of the first and second portions 224 and 226 in FIGS. 12–14 of the bottom AFM layer in the same direction.

At the wafer level, but preferably at the row level, as shown in FIG. 18, a current pulse (I) is applied to terminals of the first and second leads 234 and 236 in FIGS. 12–14 for applying the current pulse through the spin valve sensor 202. As shown in FIG. 19, this causes the free layer 720 to apply a current pulse field 722 on the pinned layer 724. This causes the magnetic moment 726 of the pinned layer to be directed perpendicular to and toward the ABS as shown. The current pulse also discretely generates heat in the spin valve sensor and in the third portion 728 of the bottom AFM layer 730 which, in combination with the magnetic moment 726, causes magnetic spins of the third portion of the bottom AFM layer to be directed perpendicular to and toward the ABS as shown at 732. Because of the discrete heating by the current pulse, the orientation 734 of the first and second portions 736 and 738 of the bottom AFM layer have not been disturbed because they have not been sufficiently heated toward the blocking temperature of the bottom AFM layer 730. In the preferred embodiment the blocking temperature of the bottom AFM layer 728 is below 250° C. Materials suitable for this purpose are nickel oxide (NiO), alpha ferric oxide (αFe$_2$O$_3$) and iridium manganese (IrMn). Preferred fields in the first step shown in FIG. 18 are 5,000 Oe for a simple spin valve sensor and 12,000 Oe for an AP pinned spin valve sensor. In the second step, shown in FIGS. 18 and 19, a desired reset voltage is 1 volt for a period of 100 nanoseconds. This will provide a temperature of at least 160°–180°, which is near enough to the blocking temperature of the bottom AFM layer 730 to set the magnetic spins of the third portion 728 of the bottom AFM layer. In the embodiment 400 in FIG. 14 the first step sets the bottom AFM layer 220 and the second step sets the AFM layer 402.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and the accompanying drawings.

I claim:

1. A magnetic read head, which has an air bearing surface (ABS), a sensor region that is defined as the width of a spin valve sensor and first and second side regions which extend along the ABS and away from the sensor region, the read head comprising:

a spin valve sensor having first and second side edges that are spaced apart by said width that defines said sensor region;

the spin valve sensor including:

a ferromagnetic pinned layer and a ferromagnetic free layer; and a nonmagnetic conductive spacer layer located between the pinned layer and the free layer; and ferromagnetic first and second biasing layers located in the first and second side regions respectively and magnetically coupled to the first and second side edges respectively of the spin valve sensor;

a first antiferromagnetic (AFM) layer having first and second portions located in the first and second side regions respectively and a third portion located in said sensor region;

the first and second portions of the first AFM layer being exchange coupled to the first and second biasing layers respectively;

each of the first and second portions of the first AFM layer having magnetic spins that are oriented parallel to the ABS and transverse said first and second side edges;

the pinned layer being exchange coupled to the third portion of the first AFM layer; and the third portion of the first AFM layer having magnetic spins that are oriented perpendicular to the ABS.

2. A magnetic read head as claimed in claim 1 including:

first and second lead layers located in the first and second side regions respectively and electrically connected to the first and second side edges respectively of the spin valve sensor;

first and second read gap structures;

the spin valve sensor, the first and second biasing layers and the first and second lead layers being located between the first and second read gap structures;

ferromagnetic first and second shield layers; and the first and second read gap structures being located between the first and second shield layers.

3. A magnetic read head as claimed in claim 2 wherein the pinned layer is an antiparallel (AP) pinned layer that comprises:

first and second ferromagnetic pinned films with the first pinned film being pinned by the third portion of the first AFM layer in a first direction; and an AP coupling film located between the first and second pinned films so that the second pinned film is pinned by antiparallel exchange coupling with the first pinned film in a second direction that is antiparallel to said first direction.

4. A magnetic read head as claimed in claim 2 wherein each of the first and second biasing layers has a thickness equal to or greater than a thickness of the free layer.

5. A magnetic read head as claimed in claim 2 wherein the first AFM layer is selected from the group comprising nickel oxide (NiO), alpha ferric oxide ($\alpha Fe_2O_3$), nickel manganese (NiMn), platinum manganese (PtMn), and chromium manganese (CrMn).

6. A magnetic read head as claimed in claim 2 wherein the first AFM layer is nonconductive.

7. A magnetic read head as claimed in claim 6 wherein the first read gap structure comprises the first AFM layer.

8. A magnetic read head as claimed in claim 6 wherein the first read gap structure consists of the first AFM layer.

9. A magnetic read head as claimed in claim 2 wherein the first AFM layer has a blocking temperature below 250° C.

10. A magnetic read head as claimed in claim 9 wherein each of the first and second biasing layers has a thickness equal to or greater than a thickness of the free layer.

11. A magnetic read head as claimed in claim 10 wherein the first AFM layer is selected from the group comprising nickel oxide (NiO), alpha ferric oxide ($\alpha Fe_2O_3$), nickel manganese (NiMn), platinum manganese (PtMn), and chromium manganese (CrMn).

12. A magnetic read head as claimed in claim 10 wherein the first AFM layer is iridium manganese (IrMn).

13. A magnetic read head as claimed in claim 10 including:

the spin valve sensor having first second side edges that are tapered.

14. A magnetic read head as claimed in claim 13 wherein the first AFM layer is nonconductive.

15. A magnetic read head as claimed in claim 14 wherein the first AFM layer is nickel oxide (NiO).

16. A magnetic read head as claimed in claim 15 wherein the first read gap structure comprises the first AFM layer.

17. A magnetic read head as claimed in claim 15 wherein the first read gap structure consists of the first AFM layer.

18. A magnetic read head as claimed in claim 2 including:

second and third conductive antiferromagnetic (AFM) layers located in the first and second side regions on and interfacially engaging the first and second biasing layers respectively and having magnetic spins that are oriented parallel to the ABS and transverse said first and second side edges.

19. A magnetic read head as claimed in claim 18 wherein the first AFM layer has a blocking temperature below 250° C.

20. A magnetic read head as claimed in claim 2 including:

a second antiferromagnetic (AFM) layer exchange coupled to the pinned layer; and the second AFM layer having magnetic spins that are oriented in a direction perpendicular to the ABS.

21. A magnetic read head as claimed in claim 20 wherein the second AFM layer has a lower blocking temperature than the first AFM layer.

22. A magnetic read head as claimed in claim 2 wherein the spin valve sensor has no hard bias layer and said first AFM layer is the only AFM layer in the spin valve sensor.

23. A magnetic head assembly having a write head and a read head and an air bearing surface (ABS) comprising:

the read head having a sensor region that extends along the ABS, the sensor region being located between first and second side regions which extend laterally from the sensor region, the read head comprising:

a spin valve sensor having first and second side edges which are spaced apart by a width that defines said sensor region; the spin valve sensor including:

a ferromagnetic pinned layer and a ferromagnetic free layer; and a nonmagnetic conductive spacer layer located between the pinned layer and the free layer; and ferromagnetic first and second biasing layers located in the first and second side regions respectively and magnetically coupled to the first and second side edges respectively of the spin valve sensor;

a first antiferromagnetic (AFM) layer having first and second portions located in the first and second side regions respectively and a third portion located in said sensor region;

the first and second portions of the first AFM layer being exchange coupled to the first and second biasing layers respectively;

each of the first and second portions of the first AFM layer having magnetic spins that are oriented parallel to the ABS and said track width;

the pinned layer being exchange coupled to the third portion of the first AFM layer; and the third portion of the first AFM layer having magnetic spins that are oriented perpendicular to the ABS;

the write head including:
  first and second pole piece layers and a write gap layer;
  the first and second pole piece layers being separated by the write gap layer at the ABS and connected at a back gap that is recessed rearwardly in the head from the ABS;
  an insulation stack having at least first and second insulation layers;
  at least one coil layer embedded in the insulation stack; and
  the insulation stack and the at least one coil layer being located between the first and second pole piece layers.

24. A magnetic head assembly as claimed in claim 23 including:
  first and second lead layers located in the first and second side regions respectively and electrically connected to the first and second side edges respectively of the spin valve sensor;
  first and second read gap structures;
  the spin valve sensor, the first and second biasing layers and the first and second lead layers being located between the first and second read gap structures;
  a ferromagnetic first shield layer;
  the first and second gap structures being located between the first shield layer and the first pole piece layer.

25. A magnetic head assembly as claimed in claim 24 including:
  a ferromagnetic second shield layer;
  a nonmagnetic isolation layer located between the second shield layer and the first pole piece layer.

26. A magnetic head assembly as claimed in claim 24 wherein the first AFM layer has a blocking temperature below 250° C.

27. A magnetic head assembly as claimed in claim 26 including:
  the spin valve sensor having first second side edges that are tapered.

28. A magnetic head assembly as claimed in claim 27 wherein the first AFM layer is nonconductive.

29. A magnetic head assembly as claimed in claim 28 wherein the first read gap structure comprises the first AFM layer.

30. A magnetic head assembly as claimed in claim 29 wherein the first AFM layer is nickel oxide (NiO).

31. A magnetic head assembly as claimed in claim 24 including:
  second and third conductive antiferromagnetic (AFM) layers located in the first and second side regions on and interfacially engaging the first and second biasing layers respectively and having magnetic spins that are oriented parallel to the ABS and transverse said first and second side edges.

32. A magnetic head assembly as claimed in claim 31 wherein the first AFM layer has a blocking temperature below 250° C.

33. A magnetic head assembly as claimed in claim 24 including:
  a second antiferromagnetic (AFM) layer exchange coupled to the pinned layer; and
  the second AFM layer having magnetic spins that are oriented in a direction perpendicular to the ABS.

34. A magnetic head assembly as claimed in claim 33 wherein the second AFM layer has a lower blocking temperature than the first AFM layer.

35. A magnetic head assembly as claimed in claim 24 wherein the spin valve sensor has no hard bias layer and said first AFM layer is the only AFM layer in the spin valve sensor.

36. A magnetic disk drive that includes at least one magnetic head assembly that includes a write head, a read head and an air bearing surface (ABS), the disk drive comprising:
  the read head having a sensor region that extends along the ABS, the sensor region being located between first and second side regions which extend laterally from the sensor region;
  the read head including a spin valve sensor having first and second side edges that are spaced apart by a width that defines said sensor region;
  the spin valve sensor including a ferromagnetic pinned layer, a ferromagnetic free layer; and a nonmagnetic electrically conductive spacer layer located between the pinned layer and the free layer;
  ferromagnetic first and second biasing layers located in the first and second side regions respectively and magnetically coupled to the first and second side edges respectively of the spin valve sensor;
  a first antiferromagnetic (AFM) layer having first and second portions located in the first and second side regions respectively and a third portion located in said sensor region;
  the first and second portions of the first AFM layer being exchange coupled to the first and second biasing layers respectively;
  each of the first and second portions of the first AFM layer having magnetic spins that are oriented parallel to the ABS and transverse to said first and second side edges;
  the pinned layer being exchange coupled to the third portion of the first AFM layer; and
  the third portion of the first AFM layer having magnetic spins that are oriented perpendicular to the ABS;
  the write head including:
    first and second pole piece layers and a write gap layer;
    the first and second pole piece layers being separated by the write gap layer at the ABS and connected at a back gap that is recessed rearwardly in the head from the ABS;
    an insulation stack having at least first and second insulation layers;
    at least one coil layer embedded in the insulation stack; and
    the insulation stack and the at least one coil layer being located between the first and second pole piece layers; and
  a housing;
  a magnetic disk rotatably supported in the housing;
  a support mounted in the housing for supporting the magnetic head assembly with said ABS facing the magnetic disk so that the magnetic head assembly is in a transducing relationship with the magnetic disk;
  means for rotating the magnetic disk;
  positioning means connected to the support for moving the magnetic head to multiple positions with respect to said magnetic disk; and
  processing means connected to the magnetic head, to the means for rotating the magnetic disk and to the positioning means for exchanging signals with the magnetic head, for controlling movement of the magnetic disk and for controlling the position of the magnetic head.

37. A magnetic disk drive as claimed in claim 36 including:
first and second lead layers located in the first and second side regions respectively and electrically connected to the first and second side edges respectively of the spin valve sensor;
first and second read gap structures;
the spin valve sensor, the first and second biasing layers and the first and second lead layers being located between the first and second read gap structures;
a ferromagnetic first shield layer;
the first and second gap structures being located between the first shield layer and the first pole piece layer.

38. A magnetic disk drive as claimed in claim 37 including:
a ferromagnetic second shield layer;
a nonmagnetic isolation layer located between the second shield layer and the first pole piece layer.

39. A magnetic disk drive as claimed in claim 37 wherein the first AFM layer has a blocking temperature below 250° C.

40. A magnetic disk drive as claimed in claim 39 wherein said first and second side edges are tapered.

41. A magnetic disk drive as claimed in claim 40 wherein the first AFM layer is nonconductive.

42. A magnetic disk drive as claimed in claim 41 wherein the first read gap structure comprises the first AFM layer.

43. A magnetic disk drive as claimed in claim 42 wherein the first AFM layer is nickel oxide (NiO).

44. A magnetic disk drive as claimed in claim 37 including:
second and third conductive antiferromagnetic (AFM) layers located in the first and second side regions on and interfacially engaging the first and second biasing layers respectively and having magnetic spins that are oriented parallel to the ABS and transverse said first and second side edges.

45. A magnetic disk drive as claimed in claim 44 wherein the first AFM layer has a blocking temperature below 250° C.

46. A magnetic disk drive as claimed in claim 37 including:
a second antiferromagnetic (AFM) layer exchange coupled to the pinned layer; and
the second AFM layer having magnetic spins that are oriented in a direction perpendicular to the ABS.

47. A magnetic disk drive as claimed in claim 46 wherein the second AFM layer has a lower blocking temperature than the first AFM layer.

48. A magnetic disk drive as claimed in claim 37 wherein the spin valve sensor has no hard bias layer and said first AFM layer is the only AFM layer in the spin valve sensor.

* * * * *